United States Patent [19]
Petersen

[11] Patent Number: 4,676,634
[45] Date of Patent: Jun. 30, 1987

[54] DETECTOR DEVICE FOR A ROTATING LIGHT BEAM
[75] Inventor: Alan Petersen, Cupertino, Calif.
[73] Assignee: Spectra-Physics, Inc., San Jose, Calif.
[21] Appl. No.: 762,518
[22] Filed: Aug. 5, 1985
[51] Int. Cl.⁴ ............................................... G01C 3/08
[52] U.S. Cl. ...................................... 356/4; 356/152; 33/293
[58] Field of Search ............................... 356/1, 4, 152; 250/211 R, 202; 33/293, 294; 354/403

[56] References Cited
U.S. PATENT DOCUMENTS

| | | | |
|---|---|---|---|
| 3,711,716 | 1/1973 | Koyano et al. | 250/202 |
| 3,767,923 | 10/1973 | Bardwell | 250/202 |
| 4,023,908 | 5/1977 | Johnson et al. | 356/4 X |
| 4,030,832 | 6/1977 | Rando et al. | 356/152 |
| 4,062,634 | 12/1977 | Rando et al. | 356/152 |
| 4,200,787 | 4/1980 | Carson | 250/227 |
| 4,240,208 | 12/1980 | Pehrson | 33/293 |

Primary Examiner—L. T. Hix
Assistant Examiner—D. Rutledge
Attorney, Agent, or Firm—Killworth, Gottman, Hagan & Schaeff

[57] ABSTRACT

A detector device for a rotating light beam, which beam defines a reference plane, includes a pair of adjacent detector elements which provide detection signals when illuminated by the beam. If the beam is above or below a first reference band, the detection signals differ sufficiently in amplitude to actuate a comparator. An averaging circuit determines if the beam is above or below the first reference band during a certain number of a set of immediately preceding rotations of the beam, and appropriate visual and audible indication are produced. The device may also provide an indication that the beam is above or below a second reference band which is aligned with, but wider than, the first reference band. The widths of the reference bands may be adjusted.

20 Claims, 4 Drawing Figures

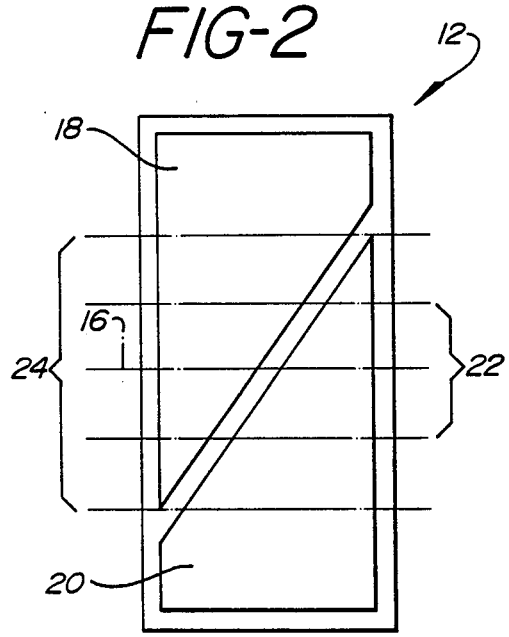
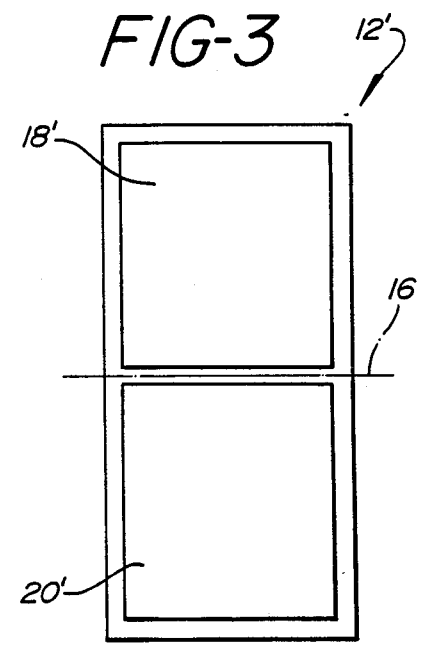
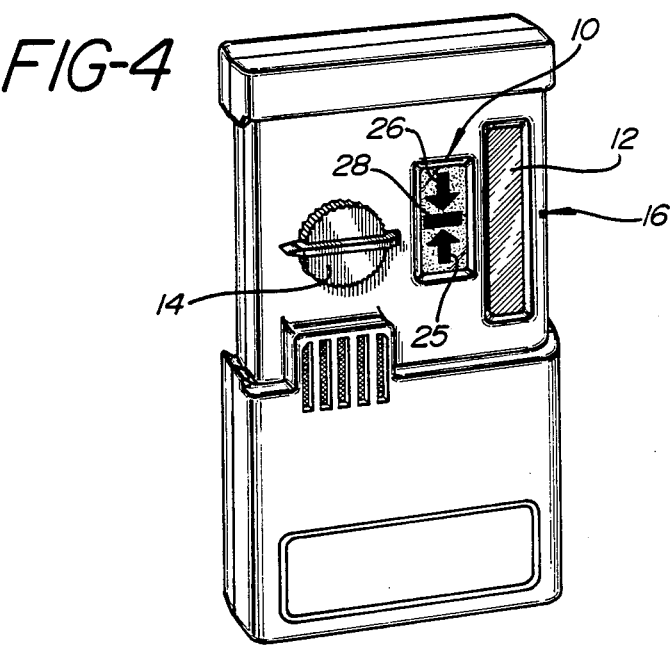

DETECTOR DEVICE FOR A ROTATING LIGHT BEAM

BACKGROUND OF THE INVENTION

The present invention relates to equipment of the type used in surveying and construction, and, more particularly, to a detector device for such an application which detects the position or level of a reference plane defined by a rotating laser beam.

Laser beam systems have been employed in surveying and construction in which a laser beam is rotated in either a horizontal or graded plane. U.S. Pat. No. 4,062,634, issued Dec. 13, 1977, illustrates a laser projector device which provides such a rotating reference beam. The rotating beam defines a plane, and various measurements can be made using the plane as a reference. For example, the elevation of a point remote from the laser beam projector device may be measured by means of a rod on which a laser beam detector is mounted. The bottom of the rod rests on the ground at the point where the measurement is to be made, and the operator moves the detector along the rod to a position where it intercepts the laser beam, as indicated by a meter or other display on the detector device. One such detector device is shown in U.S. Pat. No. 4,240,208, issued Dec. 23, 1980, to Pehrson. Other construction applications for laser systems include leveling concrete forms or foundations, setting grade stakes, screeding, establishing foundation heights, and setting plumbing and drains.

Rotating laser beam systems have in the past had certain limitaions when used over relatively long distances. Although projected very precisely from the laser projector device, the beam is nevertheless subject to random disturbance by various environmental factors, such as thermal air currents. Additionally, although the projector device which provides the rotating beam is accurately positioned and aligned, it may be subjected to some slight vibration as a result of wind, which vibration produces random deflection of the beam out of its reference plane.

A detector device typically indicates whether the beam is striking the device at a reference level on the device, or whether the beam is striking the detector device above or below the reference level. When the height of the beam is fluctuating randomly, however, the detector may produce rapidly changing "high", "low" and "on" readings. As a consequence, the detector device will not provide a meaningful indication of beam height to the user under these conditions.

In one prior art system, an attempt was made to reduce fluctations in readings by requiring that a high or low indication be provided only if two such measurements are made without an intermediate measurement of opposite sign. While providing some improvement over prior art detectors, this system nevertheless retained an undesirable degree of sensitivity to random variations in beam position.

Accordingly, it is seen that there is a need for a detector for a light beam, such as a laser beam, which detects the position of the beam accurately even, though the beam is subjected to random positional disturbances.

SUMMARY OF THE INVENTION

This need is met by a detector device for detecting and providing an indication of the position of a moving reference beam as the beam repeatedly sweeps across the device. The device includes sensing means for sensing the rotating reference light beam during each successive rotation of the beam, and first detector means, responsive to the sensing means, for detecting if the beam is above or below a first reference band. A first averaging means is responsive to the first detector means for determining if the beam is above or below the first reference band during a certain number of a predetermined number of preceding rotations. A display means, responsive to the first averaging means, provides an indication that the beam is either above or below the first reference band during the certain number of rotations, and also provides an indication that the beam is within the reference band if there is no indication that the beam is either above or below the reference band.

The detector device may further include a second detector means, responsive to the sensing means, for detecting if the beam is above or below a second reference band, and second averaging means, responsive to the second detector means, for determining if the beam is above or below the second reference band during a certain number of a predetermined number of preceding rotations of the beam. The display means also provides an indication if the second beam is either above or below the second reference band during the certain number of rotations.

The first and second detector means comprise means for altering the widths of the first and second reference band. The second reference band is substantially aligned with, but wider than, the first reference band. The certain number and the predetermined number of rotations of the beam may both be three. The detector device includes a photodetector means having first and second photodetector elements positioned adjacent each other, such that the reference light beam may repeatedly sweep across either or both of the elements depending upon the position of the device with respect to the beam. The elements provide first and second detection signals, respectively, in response to impingement of the reference beam thereon. The reference beam sweeps across substantially equal areas on both of the elements and produces substantially equal detection signals when a reference band defined by the detector device is aligned with the beam.

A first attenuator receives the first detection signal, and provides a first attenuated detection signal. A second attenuator receives the second detection signal and provides a second attenuated detection signal. A first comparator means, responsive to the first attenuated detection signal and to the second detection signal, provides an output when the first attenuated detection signal exceeds the second detection signal. A second comparator means, responsive to the second attenuated detection signal and to the first detection signal, provides an output when the second attenuated detection signal exceeds the first detection signal. An averaging circuit means is responsive to the outputs of the first and second comparator means for separately averaging the outputs of the first and second comparator means over a predetermined number of rotations of the light beam, and for providing an output signal when the reference light beam is sufficiently above or below the reference level during a certain number of the predetermined number of preceding beam rotations. A display means is responsive to the averaging circuit means to provide a visual indication of the location of the light beam. The averaging circuit means includes a latch circuit for storing outputs from the first and second comparator means, and capacitor circuits connected to receive respective comparator outputs.

A level sensing means provides an output when the potential level of any of the capacitor circuits exceeds a set level. The first and second attenuators include means for adjusting the amount of attenuation, whereby the predetermined amount of displacement of the beam from the reference which produces an output from the first and second comparators is adjusted.

A method of indicating the position of a rotating reference light beam comprises the steps of:
(a) sensing the position of the rotating reference light beam during each successive rotation of the beam;
(b) determining whether the beam is above, below, or within a first reference band;
(c) providing an indication that the beam is above the first reference band if the beam is determined to be above the first reference band during a certain number of a predetermined number of preceding rotations;
(d) providing an indication that the beam is below the first reference band if the beam is determined to be below the first reference band during a certain number of a predetermined number of preceding rotations; and
(e) providing an indication that the beam is within the first reference band if there is no indication that the beam is either above or below the reference band.

The step of determining whether the beam is above, below, or within a first reference band may include the step of selecting the width of the first reference band. The method may further include the step of determining whether the beam is above or below a second reference band which is greater in width than, and aligned with, the first reference band. The method may further include the step of providing an indication that the beam is above or below the second reference band during a certain number of a predetermined number of preceding rotations. The step of determining whether the beam is above or below a second reference band may include the step of selecting the width of the second reference band. The predetermined number and the certain number may both be three.

The step of sensing the position of the rotating reference beam may include the step of positioning a plurality of photodetector elements at approximately the height of the beam such that the beam sweeps across one or more photodetector elements. The steps of providing an indication that the beam is above, below, or within the first reference band may include the step of providing visual indications or audible indications.

Accordingly, it is an object of the present invention to provide a detector device for detecting a moving reference beam as the beam repeatedly sweeps across the device, and a method of indicating the position of the beam, in which fluctuations in beam position do not adversely affect detection; to provide such a detector device and method in which sensed beam position is averaged over a predetermined number of beam sweeps; and to provide such a detector device and method in which the accuracy of beam location detection may be adjusted.

This, and other objects and advantages of the invention, will become apparent from the following detailed description, the accompanying drawings, and the appended claims.

BRIEF DESCRIPTION OF THE DRAWINGS

FIGS. 2 and 3 illustrate alternative configurations for the photodetector elements of the detector device; and FIG. 4 is a perspective view of the detector device, showing the photodetector means and the display.

DETAILED DESCRIPTION OF THE PREFERRED EMBODIMENT

Figure 1:
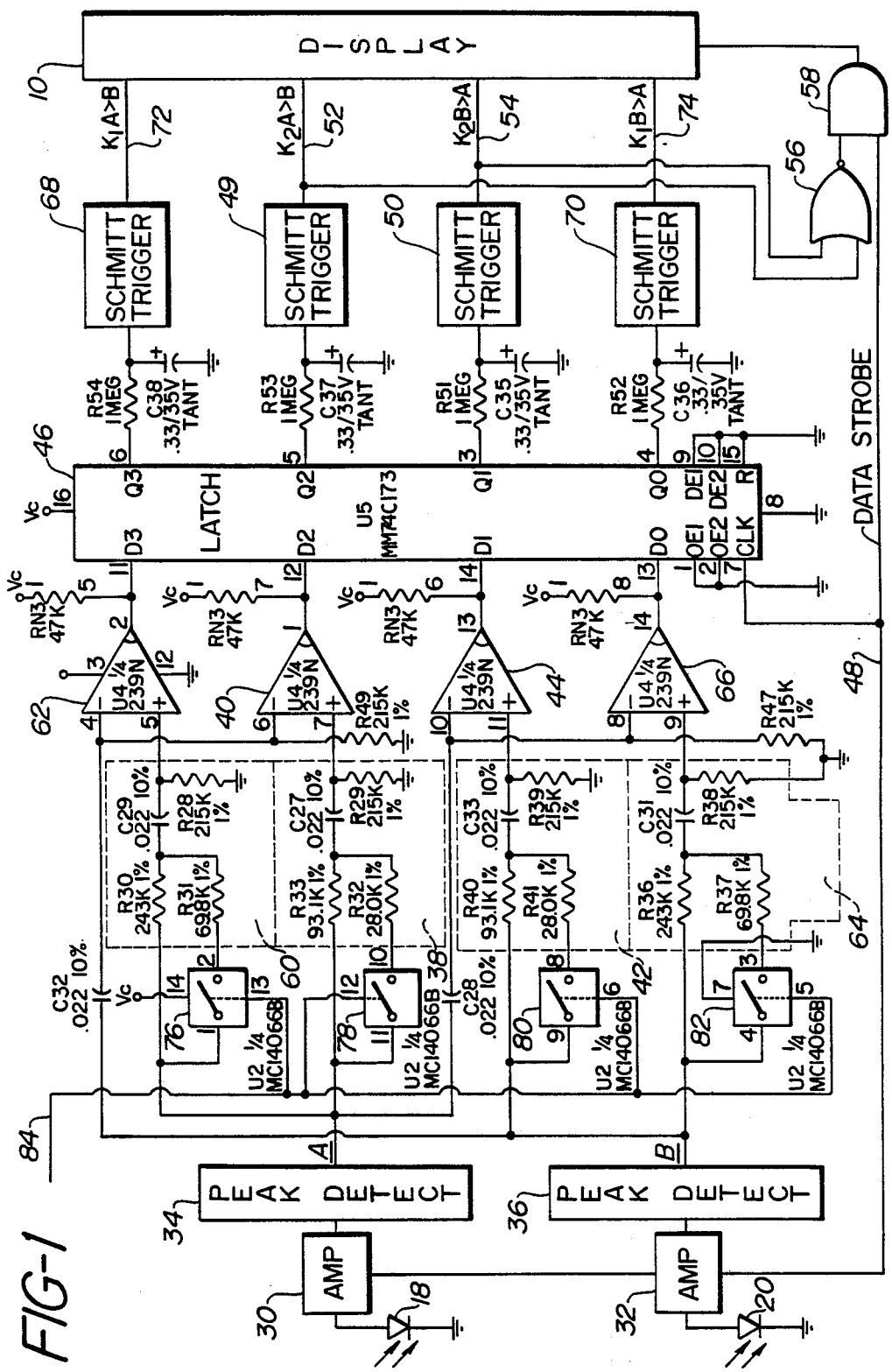
FIG. 1 is an electrical schematic representation of the circuitry of the detector device of the present invention.

FIGS. 1-4 illustrate a detector device, constructed according to the present invention, for detecting a moving reference light beam, such as a laser beam, which is rotated in a reference plane and which repeatedly sweeps across the device. Such a rotating reference beam may, for example, be produced by a device such as shown in U.S. Pat. No. 4,062,634, issued Dec. —, 1977, to Rando et al. The Rando et al device projects a laser beam in a horizontal direction and rotates the beam so as to sweep a horizontal plane. The beam provides a reference which may be used in many surveying and construction applications.

The present invention is directed to a detector device which locates the laser beam as the beam repeatedly sweeps across the device. The detector device may be clamped on a grade rod, and raised or lowered on the rod until the reference beam is sensed, thus providing a grade measurement. The detector device can be used in a number of other ways in construction applications.

As seen in FIG. 4, the detector device is a small, portable, battery-powered unit which includes a display 10 and a photodetector means positioned in window 12. The detector device is switched on with control knob 14 and then positioned at the approximate height of the rotating reference light beam. The beam sweeps across the window 12 during each rotation, and the position of the beam with respect to a reference 16, generally midway between the top and bottom of the window 12, is sensed. The device, by means of circuitry discussed below in conjunction with FIG. 1, determines whether the beam is above, below, or within a first reference band.

FIG. 2 depicts the window 12 in greater detail and a pair of photodetector elements 18 and 20. The detector device determines if the center of the beam is above a first reference band 22, below the first reference band 22, or within the first reference band 22. The display 10, which may for example be an LCD display, includes a pair of arrows 25 and 26 and a bar 28. Arrow 25 and arrow 26 are displayed if the beam is below or above the first reference band 22, respectively, as the beam sweeps across the photodetector elements 18 and 20. Bar 28 is displayed if the beam is within the band 22.

The difficulty encountered with prior art detector devices is the inability of such devices to provide a stable display in instances where the light beam is subjected to random positional disturbances. To overcome this shortcoming, the present invention detects whether the beam is above the reference band 22 during a certain number of preceding rotations of the beam, and, only then, provides a "high" display. For this purpose, the certain number of "high" measurements must occur during a predetermined number of immediately preceding measurements. Similarly, the "low" display is provided only if the beam is below the first reference band during a certain number of a predetermined number of immediately preceding rotations. Failing to detect either of these two conditions, the device provides an "on" display indicating that beam is within the reference band. As a consequence, the display is stabilized and the deleterious effect of random positional error in the beam during successive sweeps and measurements is reduced.

The detector device is further enhanced by circuitry which permits the width of the reference band 22 to be selected. Furthermore, the circuitry permits determination of whether the beam is above or below a second reference band 24 which is greater in width than, but aligned with, the first reference band 22. In a manner similar to that explained above in connection with reference band 22, the detector device provides a display indicating the beam is above or below the second reference band 24 only if such measurements are made during a certain number of a predetermined number of immediately preceding rotations of the beam.

As seen in FIG. 4, the display 10 may indicate beam position in the dual band detection mode by displaying the bar 28 and one of the arrows 25 or 26 when the beam is outside the band 22, but not outside the band 24, and by displaying only one of the arrows 25 or 26 when the beam is above or below the second reference band. If desired, an audible indicator, such as a buzzer, may also be actuated to provide an audible signal as to beam position. Intermittent tones of differing periods may be produced for high or low indications, and a continuous tone produced to indicate that the beam is within the reference band.

As stated previously, the detector device indicates that the beam is above or below a reference band only if a certain number of the immediately preceding rotations have produced a measurement that the beam is high or low. For example, the device may be configured to provide an indication that the beam is high or low only if all three of the three immediately preceding rotations of the beam have produced a high or a low measurement. Alternatively, a high or low indication may be provided only if any two of the preceding three rotations, or any three of the preceding four rotations, have produced a high or a low measurement. Effectively, the device repeatedly takes an average of an immediately preceding set of positional measurements and if a sufficient number of these measurements have been either high or low so as to meet established criteria, a high or low indication is produced.

Reference is made to FIG. 1, which illustrates the circuitry of the detector device. A photodetector means for sensing the rotating reference light beam during each successive rotation of the beam includes photodetector elements 18 and 20, amplifiers 30 and 32, and peak detectors 34 and 36. Detectors 34 and 36 provide first and second detection signals A and B, respectively, which signals are directly related in amplitude to the area of the detector elements illuminated, and to the intensity of the illumination. As may be appreciated from reference to FIG. 2, the farther above the reference line 16 that the beam sweeps the elements 18 and 20, the greater the area of illumination of detector element 18 and, therefore, the larger the amplitude of the detection signal A. Similarly, the farther below reference line 16 that the beam sweeps across the elements 18 and 20, the greater the amplitude of the detection signal B.

A first detector means, including a first attenuator 38 and first comparator means 40, and second attenuator 42 and second comparator means 44, is responsive to signals A and B for detecting if the beam is above or below the first reference band 22. The first attenuator 38, including resistors R29 and R33, receives the detection signal A and provides an attenuated detection signal to the comparator 40. The attenuation factor, $K_2$, is 0.7, such that approximately 0.7A is supplied to the positive input of comparator 40 and compared against signal B. If $K_2A$ is greater than B, the output of comparator 40 goes high, indicating that the beam is above the first reference band. In similar fashion, B is attenuated to 0.7B by attenuator 42 and compared against A by comparator 44. If $K_2B$ is greater than A, the output of comparator 44 goes high, indicating that the beam is below the reference band 22.

A latch circuit 46 is clocked by a data strobe signal on line 48 whenever either of the elements 18 and 20 provides an output. Latch 46 then stores the signals supplied to its D0-D3 inputs and supplies them to its Q0-Q3 outputs, respectively, until receipt of the next strobe signal. Capacitors C35 and C37, resistors R51 and R53, and Schmitt trigger circuits 49 and 50 make up a first averaging circuit means for determining if the beam is above or below the first reference band during a sufficient number of immediately preceding rotations of the beam.

In the illustrated circuit, if the output of comparator 40 is high for a time period equal to three rotations of the beam, the capacitor C37 will charge to the threshold level for Schmitt trigger circuit 49, causing the output line 52 to go high. If, on the other hand, the three preceding beam measurements have not all produced a high output from comparator 40, the capacitor C37 will not be sufficiently charged to trigger circuit 49. In a similar fashion, capacitor C35 is charged to a level sufficient to trigger circuit 50 only if the output of comparator 49 is high during each of the immediately preceding three reference beam rotations. This provides a high output on line 54, indicating that the beam is below the reference band 22. If neither of lines 52 and 54 are high, then the output of NOR gate 56, gated through AND gate 58, is supplied to display 10, indicating that the beam is within the reference band 22.

A second detector means, including attenuator circuit 60, comparator 62, attenuator circuit 64, and comparator 66, detects whether the beam is above or below the second reference band 24. Resistor R30 and resistor R28 provide a signal to the positive input of comparator 62 equal to $K_1A$, where $K_1$ is approximately 0.47. If $K_1A$ is greater than B, the output of comparator 62 goes high, indicating that the beam has been detected above second reference band 24. Similarly, if $K_1B$ is greater than A, the output of comparator 66 goes high, indicating that the beam has been detected below second reference band 24.

The outputs of comparators 62 and 66 are stored by latch 46 and utilized to charge capacitors C38 and C36. These capacitors, in combination with Schmitt trigger circuits 68 and 70, make up a second means for averaging the outputs of the comparators 62 and 66. If the beam is above or below the second reference band 24 during a certain number of the predetermined number of preceding rotations, the respective capacitor will be charged sufficiently to trigger the associated Schmitt trigger circuit 68 or 70. The trigger circuit outputs on line 72 and 74 are supplied to display 10.

It will be appreciated that for actuation of trigger circuits 49, 40, 68, and 70, the associated comparator must provide a high output during each of the preceding three beam rotations. By adjusting the values of capacitors C35, C36, C37 and C38, resistors R51, R52, R53, and R54, or other circuit components, the averaging arrangement can provide for triggering the Schmitt trigger circuits if, for example, three of the preceding four rotations of the beam produced a high output from the associated comparator. Both the number of predetermined rotations of the beam taken into account, and the number of rotations of the beam during which a capacitor must be charged to trigger the associated trigger circuit may be adjusted.

The circuit of FIG. 1 includes an arrangement whereby the width of the reference bands 22 and 24 may be adjusted. Switches 76, 78, 80, and 82 are actuated by a control signal on line 84 such that resistors R31, R32, R41, and R37 are switched in parallel with resistors R30, R33, R40, and R36, respectively. By closing switches 76–82, the amount of attenuation provided by attenuators 38, 42, 60, and 64 is reduced and the width of the bands 22 and 24 is correspondingly reduced.

FIG. 3 illustrates a photodetector means in an alternative configuration. Although the elements 18' and 20' are split along the horizontal reference line 16, it will be appreciated that the relatively large diameter of the beam results in simultaneous illumination of a substantial portion of both of the elements 18' and 20' when the center of the beam moves along line 16. A shift upward or downward of the beam produces an inequality in the detection signals A and B (FIG. 1), and the position of the beam is thus detected.

Having described the invention in detail and by reference to preferred embodiments thereof, it will be apparent that modifications and variations are possible without departing from the scope of the invention defined in the appended claims.

What is claimed is:

1. A detector device for detecting a moving reference light beam as the beam repeatedly sweeps across the device, and for providing an indication of the position of the beam with respect to a reference band defined by the device comprising:
   sensing means for sensing said reference light beam during each successive sweep of said beam,
   first detector means, responsive to said sensing means, for detecting if the beam is above or below a first reference band,
   first averaging means, responsive to said first detector means, for determining if the beam is above or below said first reference band during a certain number of a predetermined number of preceding sweeps, and
   display means, responsive to said first averaging means, for providing an indication if said beam is either above or below said first reference band during said certain number of sweeps, and for providing an indication that the beam is within the reference band if there is no indication that the beam is either above or below the reference beam.

2. The detector of claim 1 in which said first detector means comprises means for altering the width of said first reference band.

3. The detector of claim 1, further comprising:
   second detector means, responsive to said sensing means, for detecting if the beam is above or below a second reference band, and
   second averaging means, responsive to said second detector means, for determining if the beam is above or below said second reference band during a certain number of a predetermined number of preceding sweeps,
   and in which said display means provides an indication if the second beam is either above or below said second reference band during said certain number of sweeps.

4. The detector of claim 3 in which said second detector means comprises means for altering the width of said second reference band.

5. The detector of claim 3 in which said second reference band is substantially aligned with, but wider than, said first reference band.

6. The detector of claim 1 in which said certain number and said predetermined number are three.

7. A detector device for detecting a moving reference light beam as the beam repeatedly sweeps across the device and for providing an indication of the position of the beam with respect to the device, comprising:
   photodetector means, including first and second photodetector elements positioned adjacent each other on said device, such that said reference light beam may repeatedly sweep across either or both of said elements depending upon the position of said device with respect to said reference light beam, said elements providing first and second detection signals, respectively, in response to impingement of said reference beam thereon, said reference light beam sweeps across substantially equal areas on both of said elements thus providing substantially equal detection signals when a reference band defined by said detector device is aligned with said light beam,
   a first attenuator for receiving said first detection signal and providing a first attenuated detection signal,
   a second attenuator for receiving said second detection signal and providing a second attenuated detection signal,
   first comparator means, responsive to said first attenuated detection signal and to said second detection signal, for providing an output when said first attenuated detection signal exceeds said second detection signal, thereby indicating that said reference light beam is above said reference defined by said elements by at least a predetermined amount,
   second comparator means, responsive to said second attenuated detection signal and to said first detection signal, for providing an output when said second attenuated detection signal exceeds said first detection signal, thereby indicating that said reference light beam is below said reference defined by said elements by at least a predetermined amount, and
   averaging circuit means, responsive to the outputs of said first and second comparator means, for separately averaging the outputs of said first and second comparator means over a predetermined number of sweeps of said light beam across said photodetector means and for providing output signals when said reference light beam is either above or below said reference defined by said photodetector elements by a predetermined amount during a certain number of said predetermined number of preceding sweeps.

8. The detector device of claim 7 further comprising a display means, responsive to said averaging circuit means, for providing a visual indication of the location of said light beam with respect to said reference.

9. The detector device of claim 7 in which said averaging circuit means comprises:
   a latch circuit for storing each successive output from said first and second comparator means,
   capacitor circuits connected to receive the comparator outputs from the latch circuit and charge in response thereto, thus providing an indication of the average output from said comparator means over said predetermined number of sweeps, and
   level sensing means for providing an output when the potential level of any of said capacitor circuits exceeds a set level.

10. The detector device of claim 7 in which said first and second attenuators comprise means for adjusting the amount of attenuation, whereby the predetermined amount of displacement of said light beam from said reference which produces an output from said first or second comparator is adjusted.

11. The detector of claim 7 in which said averaging circuit includes means for providing an output signal when said reference light beam is neither above nor below said reference by said predetermined amount during a certain number of said predetermined number of preceding sweeps.

12. The method of indicating the position of a rotating reference light beam, comprising the steps of:
   sensing the position of said rotating reference light beam during each successive rotation of said beam,
   determining whether said beam is above, below, or within a first reference band,
   providing an indication that the beam is above said first reference band if the beam is determined to be above said first reference band during a certain number of a predetermined number of preceding rotations,
   providing an indication that the beam is below said first reference band if the beam is determined to be below the first reference band during a certain number of a predetermined number of preceding rotations, and
   providing an indication that the beam is within the first reference band if there is no indication that the beam is either above or below the reference band.

13. The method of claim 12 in which the step of determining whether said beam is above, below, or within a first reference band includes the step of selecting the width of said first reference band.

14. The method of claim 12 further including the step of determining whether said beam is above or below a second reference band, said second reference band being greater in width than, and aligned with, said first reference band.

15. The method of claim 14 further including the step of providing an indication that the beam is above or below said second reference band during a certain number of a predetermined number of preceding rotations.

16. The method of claim 14 in which said step of determining whether said beam is above or below a second reference band includes the step of selecting the width of said second reference band.

17. The method of claim 12 in which said certain number and said predetermined number are both three.

18. The method of claim 12 in which said step of sensing the height of said rotating reference light beam includes the step of positioning a plurality of photodetector elements at approximately the height of said beam such that said beam sweeps across one or more such photodetector elements.

19. The method of claim 12 in which the steps of providing an indication that the beam is above, below, or within the first reference band include the step of providing visual indications.

20. The method of claim 19 in which the steps of providing an indication that the beam is above, below, or within the first reference band include the step of providing audible indications.

* * * * *